April 5, 1949. G. G. DAVIS 2,466,389
SEAL FOR FLUID PRESSURE MOTOR VANES
Filed Aug. 2, 1947
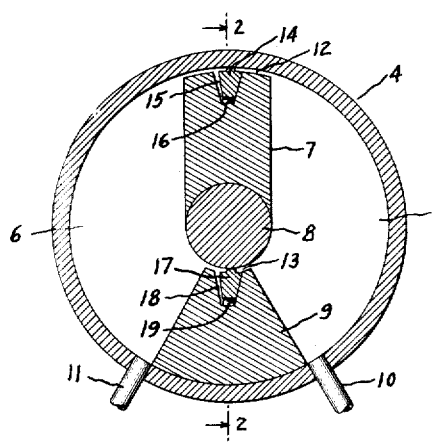
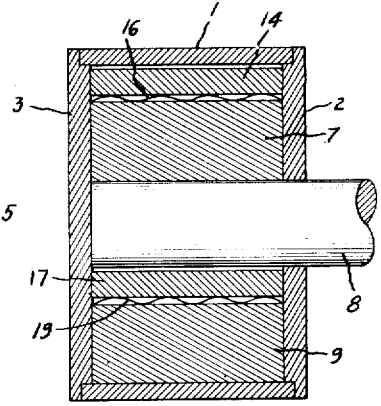
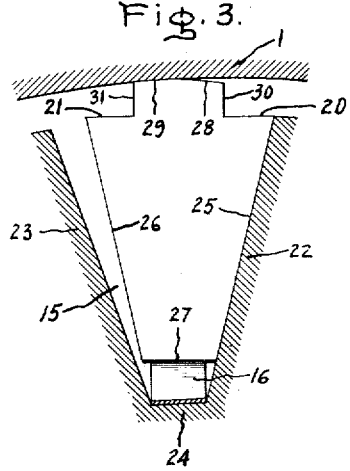
Inventor:
Glenn G. Davis
by Claude A. Mott
His Attorney.

Patented Apr. 5, 1949

2,466,389

UNITED STATES PATENT OFFICE 2,466,389

SEAL FOR FLUID PRESSURE MOTOR VANES

Glenn G. Davis, Schenectady, N. Y., assignor to General Electric Company, a corporation of New York Application August 2, 1947, Serial No. 765,757

8 Claims. (Cl. 121—38)

1

The present invention relates to fluid seals for preventing leakage of fluid and more particularly to seals for preventing fluid leakage from one pressure chamber to another pressure chamber between the adjacent surfaces of moving and stationary members of a device.

In fluid devices such as servomotors, the movable member is moved relative to the stationary member by means of fluid pressure applied to one side of a movable member, such as a piston. However, due to the necessary mechanical clearance between the piston and the stationary member, usually the cylinder wall, fluid pressure tends to equalize between the chambers formed by the piston and cylinder wall by leaking through this clearance. It has been customary to reduce leakage by maintaining very close mechanical clearances between the movable and stationary parts of a servomotor, or by means of packing seals such as organic material or metal piston rings. While close mechanical clearances can be maintained, it is very costly to maintain these clearances sufficiently small to prevent leakage. Packing seals have been unsatisfactory due to the high friction losses which necessarily accompany movement against the seal. Another disadvantage of these seals is that to maintain the seal when pressure is applied, it is necessary to have a high initial friction between the members even when no pressure is applied to the piston. With organic packing seals the material frequently comes loose and fouls the movement of the movable member. Metal piston rings can only be used where the piston is circular and the movement is along the axis of the piston.

An object of the present invention is to provide a new and improved pressure seal between stationary and movable members.

Another object of the invention is to provide a metallic seal with low friction loss between the movable and stationary members of a device.

Another object of my invention is to provide a seal having very low friction when little or no pressure is applied across the seal.

A further object of the present invention is to provide an improved seal between two pressure chambers when pressure is applied to either chamber.

Still a further object of my invention is to provide a seal which will have different sealing surfaces for either direction of movement to prevent scuffing of the cooperating surface.

Further objects and advantages of my invention will become apparent and my invention will be better understood from the following description referring to the accompanying drawing, and the features of novelty which characterize my invention will be pointed out with particularity in the claims annexed to and forming a part of this specification.

In the drawing:

Fig. 1 is a plan view partially in section of a servomotor utilizing the present invention.

Fig. 2 is an elevation view in section in the direction of the arrows along the line 2—2 of Fig. 1.

Fig. 3 is an enlarged view of a portion of Fig. 1.

Referring to Figs. 1 and 2, I have indicated a hydraulic device comprising a hydraulic motor or servomotor having a casing 1 and end plates 2 and 3 defining a cylinder indicated generally at 4. Cylinder 4 is divided into two chambers 5 and 6 by piston 7 which is integrally formed on shaft 8, and stationary barrier 9. Hydraulic fluid may be selectively admitted and withdrawn from chambers 5 and 6 through conduits 10 and 11, respectively, to cause piston 7 and shaft 8 to oscillate about the axis of shaft 8 between the limits of travel defined by barrier 9 when pressure in either chamber becomes greater than that in the opposing chamber.

Due to the mechanical clearances indicated at 12 and 13 between piston 7 and the wall of cylinder 4 and between shaft 8 and barrier 9, fluid pressure tends to equalize between chambers 5 and 6 by leaking through clearances 12 and 13. In the prior art it has been customary to either maintain clearance 12 and 13 to a small value or to provide non-metallic packing seals.

According to the present invention the necessity for either holding these clearances to a minimum or using non-metallic packing seals is obviated in the following manner.

A wedge shaped seal member indicated generally as 14 is rockably mounted in a V-shaped longitudinal groove, or recess, 15 formed in the entire length of the face of piston 7 engaging the cylinder. Biasing means, such as spring 16, is provided to hold seal 14 in engagement with the wall of cylinder 4. A second seal 17 of the same form as seal 14 is provided between barrier 9 and shaft 8. Seal 17 is rockably mounted in a V-shaped groove 18 in barrier 9 and spring 19 biases seal 17 into contact with shaft 8.

Referring now to Fig. 3 an enlarged view of seal 14, groove 15 and bias spring 16 is shown with greater fluid pressure being applied to chamber 6 than to chamber 5. As shown, seal 14 is trapezoidal in cross section with recessed shoulders 20 and 21. Groove 15 in piston 7 has a corresponding trapezoidal cut defining sides 22 and 23 and base 24. Sides 25 and 26 of seal 14 are designed to mate with sides 22 and 23 of groove 15, but the included angle between sides 25 and 26 is several degrees less than the included angle between the sides 22 and 23 of recess 15 thereby permitting seal 14 to be rocked in groove 14 between sides 22 and 23. As mentioned above, seal 14 is held in contact with the wall of cylinder 4 by means of bias spring 16. Spring 16 is preferably of the flat sinusoidal type and operates between base 27 of seal 14 and the base or bottom 24 of groove 15. The contact area between seal 14 and cylinder 4 may be two flat surfaces as indicated at 28 and 29.

As shown in Fig. 2, this type of seal operates equally well against a convex surface such as shaft 8 in the illustrated embodiment or a concave surface such as a surface of cylinder 4.

Operation of the seal is as follows: When hydraulic fluid is admitted under pressure through conduit 11 to chamber 6 and conduit 10 is opened to drain so that the pressure in chamber 6 is greater than in chamber 5, fluid will attempt to by-pass barrier 9, shaft 8 and piston 7 through the mechanical clearances indicated at 12 and 13. However, seals 14 and 17 prevent this leakage in the following manner. As shown in Fig. 3, the fluid under pressure exerts a force against the seal walls 26 and 31 to rotate the seal wall 25 into contact with the groove wall 22, thus bringing surface 29 into contact with the wall of cylinder 4. As stated above, spring 16 holds the seal in contact with the wall of cylinder 4 when pressures are equal in chambers 5 and 6. However, sufficient clearance is left between base 27 and side 26 of the seal and wall 23 of the groove to form conduit means and thus admit fluid pressure to aid the bias spring in maintaining contact between the seal and the cylinder wall, thereby causing the seal to engage the wall more firmly. However, the extent of this biasing action is controlled by the relationship between shoulder 21 and base 27, since fluid pressure operating on shoulder 21 acts in opposition to the fluid pressure on base 27. Seal 17 operates in a similar manner when fluid pressure is applied in chamber 6. Seal 17 rocks to the right and fluid pressure operates between the base of groove 18 and seal 17 to aid the biasing means, spring 19, to maintain a firm engagement between seal 17 and shaft 8.

When fluid pressure is applied to chamber 5, pressure reacts with wall 30 to rock the seal 14 to the left and bring wall 25 of seal 14 and wall 22 of groove 15 into sealing engagement, thus presenting surface 28 of the seal to the wall of cylinder 4. Seal 17 is rocked to the left in a similar manner to seal the adjacent surfaces between shaft 8 and barrier 9.

It will be clear from the foregoing that according to my invention the seal will be actuated by fluid pressure to seal the surfaces between the movable and stationary members whether the sliding friction between the member against which the seal is operating and the seal is in the direction of the rocking movement of the seal or opposed to such rocking movement. It will also be apparent that with an increase in pressure the seal will be moved into firmer engagement with the cooperating surface. Due to the fact that a different sealing surface is presented when the seal is rocked in the groove, danger of scuffing the member engaged by the seal is practically eliminated since a different surface on the seal engages the opposing member when movement is in the opposite direction. Since different surfaces of the seal are presented for both directions of movement, the seal tends to wear to a closer fit with the mating surface. As shown, the clearances 12 and 13 between the moving member such as shaft 8 and piston 7 and barrier 9 and cylinder wall 4 can be quite large while maintaining an effective seal. Seals 14 and 17 are preferably made of metal to reduce the friction between the seals and cylinder wall 4 and shaft 8.

Seals according to my invention are particularly valuable in power boost systems or servomotor mechanisms where it is desired to manually control the system. In these systems the power unit is usually permanently connected to the control means and with fluid power removed from the boost unit it is desirable to have the boost unit drag as low as possible. The seal spring can be designed so that without fluid pressure in the cylinder, the drag between the seal and the cooperating member may be almost zero.

It will be understood by those skilled in the art that the groove may be located in either the movable or stationary member, and that movement of the seal may either be with or opposed to the friction drag between the seal and the cooperating members without altering the effectiveness of the seal. Further, it will be understood that the sealing means can be effectively utilized between either flat or curved surfaces, so long as the groove is located substantially perpendicular to the direction of motion of the movable and stationary member. While I have shown the grooves and seals to be trapezoidal in cross section, other configurations may be used as will now be apparent to those skilled in the art. It will also be noted that the sealing surface of the seal may be the arc of a circle as well as flat surfaces such as 28 and 29. The sealing means may be used in either a driving or driven motor.

While I have described particular embodiments of my invention, it will occur to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. In combination a hydraulic servomotor comprising a piston movable relative to a cylinder wall, said piston having a V-shaped groove in the surface thereof adjacent said cylinder wall, a wedge-shaped sealing member rockably mounted in said groove for movement to either of two positions depending upon the direction of force of the motive fluid moving said piston and biasing means for urging said sealing member outwardly in said groove into sealing engagement with said cylinder wall, said sealing member acting to provide different sealing surfaces in each of said positions whereby danger of scuffing said cylinder wall is reduced.

2. In a hydraulic servomotor comprising a vane-type piston movable relative to a cylinder wall, said piston having a V-shaped groove in the surface thereof adjacent said cylinder wall, a wedge-shaped sealing member rockably mounted in said groove, biasing means between the base of said groove and the base of said wedge member for urging said wedge member outwardly into engagement with said cylinder wall and fluid conduit means defined by said wedge and said groove to control hydraulic fluid pressure so that said fluid pressure acting on said piston rocks said wedge member in the direction of movement of said piston and cooperates with said biasing means to urge said wedge into firmer engagement with said cylinder wall.

3. A fluid seal for preventing leakage of fluid pressure between the adjacent surfaces of two members movable relative to each other, one of said members having a longitudinal groove substantially perpendicular to the direction of movement of said member in said surface, wedge means rockably mounted in said groove for movement to either of two positions and biasing means for urging said wedge means outwardly in said groove into engagement with said adjacent surface of said other member, said wedge means being rocked into engagement with the sides of said groove by said fluid pressure.

4. Fluid sealing means between the adjacent surfaces of a relatively movable member and a relatively stationary member, one of said members having a groove in said surface, said means comprising a wedge member rockably mounted in said groove, biasing means for urging said wedge member outwardly into engagement with said adjacent surface of said other member and fluid conduit means for admitting fluid pressure to produce rocking movement of said wedge member into engagement with the walls of said groove and to cooperate with said biasing means to seal said surfaces.

5. In a hydraulic-operated motor having a member moved by hydraulic pressure relative to a second member, a pressure seal between adjacent surfaces of said members to prevent leakage between said surfaces, comprising wedge means rockably mounted in an axial groove in one of said surfaces, said wedge means being narrower than said groove, and spring means for urging said wedge means outwardly into engagement with the other of said surfaces, said hydraulic pressure forcing said wedge means against the opposite side of said groove, each side of said wedge means being adapted to engage the adjacent side of said groove.

6. A pressure-acuated seal for a pair of members having surfaces movable relative to each other, one of said members having a groove in said surface substantially perpendicular to the direction of movement of said surfaces, wedge means rockably mounted in said groove and biasing means between the base of said wedge and the bottom of said groove for urging said wedge outwardly into engagement with said surface of said other member, fluid conduit passages formed by the walls of said groove and the walls of said wedge whereby fluid pressure operating said movable member acts between the opposing walls of said groove and wedge to rock said wedge away from the direction of the applied pressure and said wedge is urged outwardly by the pressure force applied between said base of said wedge and said bottom of said groove in cooperation with said biasing means.

7. In a hydraulic servomotor comprising a casing including end walls forming a cylinder, an output shaft extending axially through one end wall, a piston vane mounted on said shaft, disposed axially between said end walls and radially to one side of said shaft, a barrier extending axially between said end walls and radially between said shaft and the axially extending wall of said cylinder, two chambers in opposed relation being formed by said barrier, shaft and piston, conduit means connected to said chambers for selectively admitting hydraulic fluid under pressure to either one of said chambers to rotate said piston, said piston having an axially extending V-shaped groove in the cylinder wall face, a wedge rockably mounted in said groove engaging the cylinder wall and having an included angle smaller than the included angle of said groove whereby said wedge may be rocked in said groove by hydraulic fluid acting against said piston in the direction of the movement of said piston.

8. Fluid sealing means between the surfaces of a relatively movable member and a relatively stationary member, one of said members having a longitudinal groove in said surface said means comprising a wedge member narrower than said groove adapted to engage said surface of said other member and rockably mounted in said groove, each side of said wedge member being adapted to engage the adjacent side of said groove as fluid pressure within said stationary member is exerted upon the opposite side of said wedge member.

GLENN G. DAVIS.

REFERENCES CITED

The following references are of record in the file of this patent:

UNITED STATES PATENTS

| Number | Name | Date |
|---|---|---|
| 518,299 | Williams | Apr. 17, 1894 |